(12) United States Patent
Nagler

(10) Patent No.: US 10,067,334 B2
(45) Date of Patent: Sep. 4, 2018

(54) OPTICAL MAGNIFIER

(71) Applicant: Tele Vue Optics, Inc., Chester, NY (US)

(72) Inventor: Albert Nagler, Wanaque, NJ (US)

(73) Assignee: Tele Vue Optics, Inc., Chester, NY (US)

( * ) Notice: Subject to any disclaimer, the term of this patent is extended or adjusted under 35 U.S.C. 154(b) by 351 days.

(21) Appl. No.: 15/139,919

(22) Filed: Apr. 27, 2016

(65) Prior Publication Data

US 2017/0315343 A1    Nov. 2, 2017

(51) Int. Cl.
*G02B 25/00* (2006.01)
*G02B 9/62* (2006.01)
*G02B 9/34* (2006.01)

(52) U.S. Cl.
CPC ............. *G02B 25/001* (2013.01); *G02B 9/34* (2013.01); *G02B 9/62* (2013.01)

(58) Field of Classification Search
None
See application file for complete search history.

(56) References Cited

U.S. PATENT DOCUMENTS

| | | |
|---|---|---|
| 4,286,844 A | 9/1981 | Nagler |
| 4,482,217 A | 11/1984 | Nagler |
| 4,525,035 A | 6/1985 | Nagler |
| 4,747,675 A | 5/1988 | Nagler |
| 5,886,825 A | 3/1999 | Bietry |
| 6,104,542 A * | 8/2000 | Omura ............... G02B 25/001 359/643 |
| 6,785,054 B1 | 8/2004 | Cahall |
| 7,599,121 B2 | 10/2009 | Miyauchi et al. |
| 7,804,651 B2 | 9/2010 | Janeczko et al. |
| 8,928,986 B2 * | 1/2015 | Fukumoto ........... G02B 25/001 359/643 |
| 2009/0067065 A1 * | 3/2009 | Suzuki ................ G02B 13/146 359/796 |
| 2014/0340558 A1 | 11/2014 | Nakahara |

OTHER PUBLICATIONS

Edmund Optics Inc., High Performance Microdisplay Eyepiece, http://www.edmundoptics.com, p. 1.

* cited by examiner

*Primary Examiner* — Darryl J Collins
*Assistant Examiner* — Gary O'Neill
(74) *Attorney, Agent, or Firm* — Gottlieb, Rackman & Reisman, P.C.

(57) ABSTRACT

An optical magnifier suitable for viewing microdisplay panels and other optical fields and providing a wide field of view with minimal aberrations across the field over a large pupil with long eye-relief. The magnifier comprises six lens elements formed without the use of expensive very high dispersion glass. The lens surfaces are spherical and/or flat thereby simplifying lens fabrication. A similar magnifier with fewer lens elements configured to view a concave image surface is also disclosed.

12 Claims, 12 Drawing Sheets

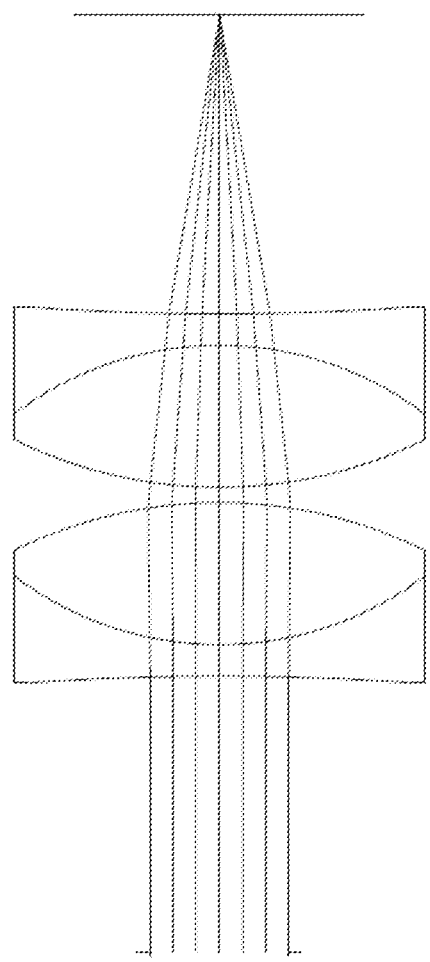
Fig 1A – PRIOR ART

OPTICAL MAGNIFIER

FIELD OF THE INVENTION

The present invention relates to an optical magnifier suitable for viewing micro-display panels and other optical fields, such as for use in an electronic viewfinder.

BACKGROUND

Optical magnifiers are lens assemblies, typically in the form of a magnifying eyepiece, which are used to allow direct viewing of small items, such as electronic solid-state micro displays. For example, conventional micro-displays can range in resolution from 640×480 pixels to 1920×1200 pixels or higher in a viewing area of less than 20 mm across. For these displays to be easily viewed, they must be magnified. Thus, devices that incorporate one or more micro-displays will typically include a magnifier for each display. A magnifying eyepiece can be stand-alone and removable from the display device or integrated into the larger assembly. Typical uses are viewfinder or other display system for devices such as still or video cameras, night-vision systems, 3D display goggles, and other systems which incorporate small display panels.

To allow for easy viewing at a distance from the eyepiece, a magnifying eyepiece should have a relatively large eye relief, such as at least 18 mm. to allow for sharp viewing without the need for the user's eye to be precisely centered along the optical axis, thereby accommodating the viewer's lateral head motion relative to the magnifier. The magnifier should also have a wide field of view, such as greater than about +/−15 degrees. It is also important to minimize optical distortions across the entire field of view. These features must also be balanced with the overall cost of the eyepiece, generally determined by a combination of the type of glass used for each for each of the lenses, the difficulty in fabricating the lenses themselves, and the size of the lens. For example, lens costs are greater when a lens is fabricated with an aspheric or diffractive surface. Lens cost also increases when exotic glass is used.

A conventional eyepiece that can be used as an optical magnifier is a Plossl-type design. One type of Plossl design is disclosed in U.S. Pat. No. 4,482,217. As shown in FIG. 1A hereto, the Plossl lens design 10 of the '217 patent is comprised of two symmetric achromatic doublets 12, 14 comprised of a dense flint glass (Refractive index $N_d$=1.667 and Abbe number v=33) and a crown glass ($N_d$=1.658 and v=51). FIG. 1B is a through focus spot diagram for an exemplary 26 mm Plossl lens like that in the '217 patent using lens elements scaled to a 30 mm focal length. For a telescope, a 30 mm eyepiece using an f/6 objective would yield a 5 mm diameter exit pupil located at a distance from the eye lens known as the "eye relief." The observer must place his eye pupil coincident with the eyepiece exit pupil to achieve full illumination and field of view. However, when used as a magnifier, there is no defined exit pupil or eye relief. This allows the observer to shift his eye laterally, imposing the necessity of far greater optical corrections. In this example, a large 10 mm entrance pupil is considered at a viewing distance of at 20 mm eye relief to illustrate the effect of lateral eye movement of a typical user with a 3 mm eye pupil (which is a typical sized pupil in daylight).

FIG. 1B is a through focus spot diagram showing spot sizes for a green wavelength of 0.588 um. The through focus spot diagram indicates the resolution over a field of view covering the eye shift within a 10 mm entrance pupil. It is desirable to minimize the spot size at the both the center and the edge of the field. As can be seen in FIG. 1B, this Plossl design provides a field of view up to 20 degrees off-axis. A user can see sharp images near the center of the field when the eye is well centered over the central axis of the lens. However, there is still noticeable off-axis aberration, increasing significantly upon reaching 20 degrees off-axis.

One way to quantify performance of a magnifier is to consider the RMS resolution values of the through focus spot diagram relative to typical visual acuity since aberrations that cannot be seen do not impact visual performance. A person with 20/20 eyesight has a visual acuity of 1' (one arc minute), meaning that they can discern features as small as one arc minute across. A person with 20/40 eyesight, still reasonable, has a visual acuity of 2'. The Plossl magnifier illustrated herein has an on-axis resolution of 4.8', a 10 degree off-axis resolution of 5.3' and a 20-degree; off-axis resolution of 13.8.

Alternative ways of illustrating lens aberrations are shown in the graphs of FIGS. 1C-1D, which show field curvature and distortion, and longitudinal aberration, for this conventional lens at the same 0.588 um light wavelength. The divergence between the tangential and sagittal lines in FIG. 1D indicates astigmatism. The astigmatism is also indicated by the diamond shape of the focus spot diagram of FIG. 1B.

More complicated magnifier designs have been developed. However, these designs also suffer from various defects. Even conventional wide-field designs suffer from undesirable off-axis edge aberration effects for wide fields. These can be particularly detrimental in applications such as magnifying of displays that require high resolutions to be seen at the edge of the field. Others lens designs compensate for aberrations but do so by using exotic glass which can be very expensive and difficult to fabricate, or by incorporating aspheric and/or diffractive lens elements, features that can also increase fabrication cost and physical variations during fabrication.

Accordingly, it is an object to provide an economical optical magnifier that produces a substantially aberration free magnified image of a display over a wide field of view of at least +/−15 degrees, with good eye relief for ease of on and off-axis viewing of the display, and which can accommodate lateral head/eye motion without degrading resolution.

It is a further object of the invention to provide such an optical magnifier with an aberration free magnified image of a display over a very wide field of view and which can be fabricated using commonly available and relatively inexpensive types of glasses.

Yet a further object of the invention is to provide such an optical magnifier in which lens surfaces are spherical or flat, thereby reducing production costs and decreasing the likelihood of performance variations during production.

SUMMARY

These and other issues are addressed by various embodiments of invention which include a magnifying eyepiece made of from four to six lenses, with each lens being a singlet (simple) lens or a plurality of lenses cemented together (such as doublet), and where the lens surfaces are spherical or substantially flat and arranged from the eye side of the magnifier to a rear object side where the field to be imaged is located.

A first embodiment of the invention, suitable for use in imaging a substantially flat surface at the focal plane is comprised of eight lenses arranged along an optical axis from the eye side to the object side. A first lens is plano-convex with the convex surface on the eye side and the object side being substantially flat. A second lens is a negative meniscus with an eye side surface that is concave and an object side surface that is convex (from the object side) and where the object side radius is greater than the eye side radius. A third lens has an eye side surface that is concave and an object side surface that is convex with a radius less than that of the eye side surface. The third lens is preferably a doublet with an internal surface dividing the two lens components that is concave from the object side and has a radius less than the radius of the object side surface. A fourth lens is a bi-convex lens with eye side and object side surfaces having substantially the same radii. A fifth lens has an eye side surface that is convex and an object side surface that is substantially flat. The fifth lens is preferably a doublet with an internal surface dividing the two lens components that is convex from the object side and has a radius larger than the eye side surface. A sixth lens is a bi-concave lens with eye side and object side surfaces having substantially the same radii.

The lenses in the first embodiment can all be formed using conventional and widely available glasses with refractive indices varying between about 1.6 and 1.76 and dispersions from about 25 to less than about 65, avoiding the use of fluorite and other exotic glasses that have lower dispersions and are more expensive and difficult to fabricate. In a particular configuration of the first embodiment, the first and second lens elements, the object side lens of the doublet third lens element, the fourth lens element, and the eye side lens of the doublet fifth lens element can all be borosilicate glass.

In a specific configuration of the first embodiment configured for a 30 mm magnifier, a magnifier can be achieved with a 10 mm entrance pupil diameter, 20 mm eye relief and having minimal aberrations for normal visible wavelengths over a field of view exceeding 15 degrees off-axis, with a tangential and sagittal field curvature up to 20 degrees off-axis not exceeding about +/−0.2 mm, with negligible astigmatism over the entire field and negligible longitudinal aberrations over the entire pupil area.

The first embodiment of the invention is particularly configured for viewing a generally flat object placed in the focal plane. When the object to be viewed is concave, a simplified second embodiment of the invention can be provided since the magnifier can take advantage of curved image field. A second embodiment of the invention, suitable for use in imaging a concave surface at the focal plane is comprised of five lenses arranged along an optical axis from the eye side to the object side. The first three lenses are similar to those in the first embodiment. A first lens is plano-convex with the convex surface on the eye side and the object side being substantially flat. A second lens is a negative meniscus lens with an eye side surface that is concave and an object side surface that is convex (from the object side) and where the object side radius is greater than the eye side radius. A third lens has an eye side surface that is substantially flat and an object side surface that is convex. The third lens is preferably a doublet and has an internal surface dividing the two lens components that is concave from the object side and has a radius less than the radius of the object side surface. A fourth lens is a plano-convex lens with a convex eye side surface and a substantially flat object side surface.

In a specific configuration of the second embodiment configured for a 30 mm magnifier operating with an concave image plane having a radius of about 40 mm, a magnifier can be achieved with a 10 mm entrance pupil diameter, 20 mm eye relief and having minimal aberrations for normal visible wavelengths over a field of view exceeding 15 degrees off-axis with negligible astigmatism over the entire field and negligible longitudinal aberrations over the entire pupil area.

Further features of the present invention will be apparent from the following description of exemplary embodiments and with reference to the attached drawings.

BRIEF DESCRIPTION OF THE FIGURES

These and other features and advantages of the invention, as well as structure and operation of various implementations of the invention, are disclosed in detail below with references to the accompanying drawings:

FIG. 1A shows the design of a prior art Plossl eyepiece which can be used as a magnifier;

DETAILED DESCRIPTION OF PREFERRED EMBODIMENTS

Figure 2A:
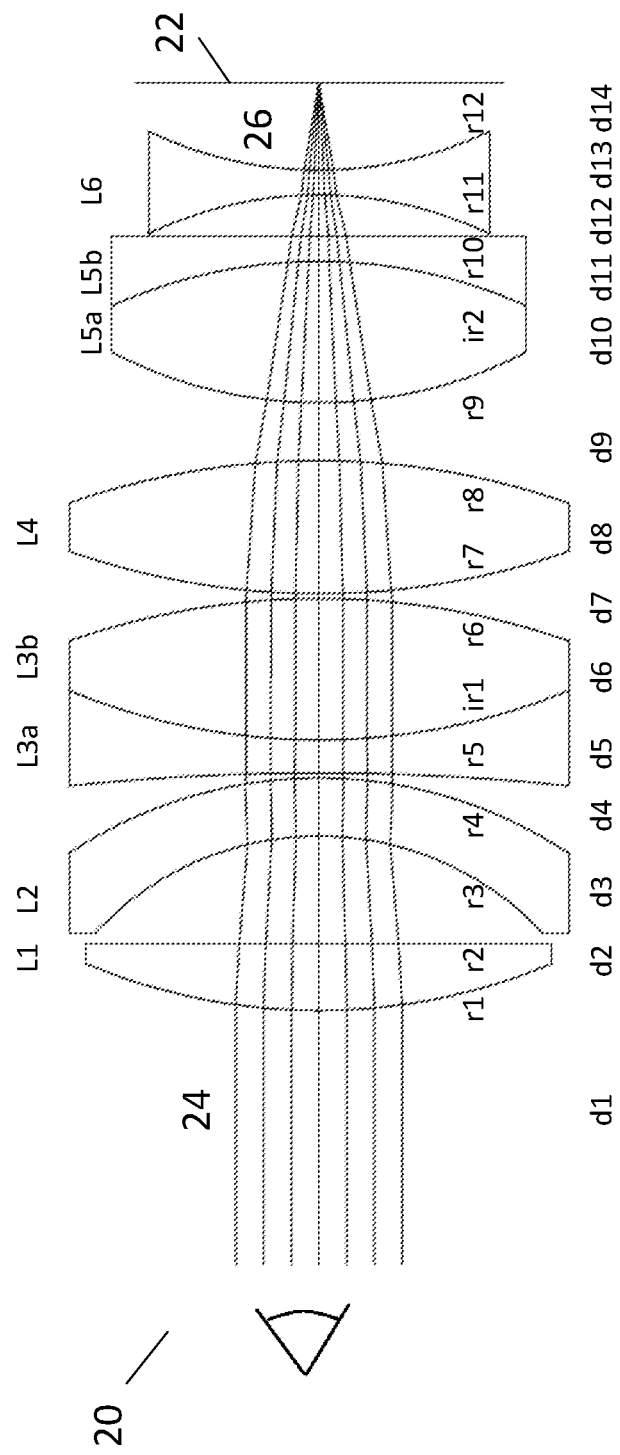
FIG. 2A is a magnifier lens system in accordance with a first embodiment of the invention.

FIG. 2A shows a first embodiment of a magnifying lens assembly 20 suitable for use as a magnifier for a substantially flat surface 22 at the focal plane, such an electronic micro-display. Magnifier 20 is comprised of six lenses (L1-L6) arranged along an optical axis from the eye side 24 to the object side 26.

The third and fifth lenses are preferably doublets and the remaining lenses are singlets. As described further below, all of the lenses have spherical or substantially flat surfaces and can be formed using inexpensive glasses that are easy to fabricate.

With reference to FIG. 2A, lens L1 is a plano-convex lens with a convex surface on the eye side having a radius r1 and the object side being substantially flat, i.e., its radius r2 is effectively infinite. Lens L2 is a negative meniscus lens with an eye side surface that is concave having a radius r3 and an object side surface that is convex (from the object side) and having a radius r4 which is greater than r3. As used herein, comparisons of two radii, such as one being larger or smaller than the other, refers to the absolute value of the radius, as the sign designates whether the radius is convex or concave. Lens L3 is preferably a doublet comprised of component lenses L3a and L3b. Lens L3 has a concave eye side surface with a radius r5, an internal surface that is concave from the object side with a internal radius ir1, and an object side surface that is convex with a radius r6. Lens L4 is a bi-convex lens with eye side and object side surfaces having radii r7 and r8 which are substantially equal to each other. Preferably, r7 and r8 are also equal to radius r6. Lens L5 is preferably a doublet comprised of component lenses L5a and L5b. Lens L5 has an eye side surface that is convex with radius r9, an internal surface dividing the two lens components that is convex from the object side and has internal radius ir2 which is greater than r9, and an object side surface that is substantially flat, i.e., its radius r10 is effectively infinite. Preferably, r9 is substantially equal to r4. Lens L6 is a bi-concave lens with eye side and object side surfaces having radii r11 and r12 which are substantially equal to each other.

The lenses in the first embodiment are preferably formed using conventional and widely available glasses with refractive indices varying between about 1.6 and 1.76 and dispersions from about 25 to less than about 65.

In a particular configuration of the embodiment of FIG. 2A, lenses L1, L2, L3b and L4 are formed of a medium index glass and lens L5a is formed of a low index glass. In this configuration, lens L3a can be formed of a high-index glass, L5b formed of a medium-index glass, and lens L6 formed of a high-index glass.

The specific radii, size, and spacing of the lenses in magnifier 20 can be varied to accommodate the size of the display (or other item) to be viewed. While lenses L3 and L5 are preferably doublets, singlets may be suitable in certain circumstances, such as where the magnifier is intended for use with a monochrome display so that chromatic aberration is not a concern. An exemplary embodiment specifying the lens radii, thickness/spacing, Refractive index $n_d$, Dispersion (Abbe number) Vd glass parameters and a preferred glass type for the lenses in magnifier 20 is set forth in Table 1 below. The thickness and radii measurements are in mm and are measured along the central optical axis. A radius of infinity refers to a substantially flat surface. Also listed is a preferred type of glass with reference to the OHARA catalog glass designations.

TABLE 1

| Lens | Radii | Thickness/spacing | $n_d$ | Vd | Glass |
|---|---|---|---|---|---|
| L1 | R1 = 36.2 | D1 = 20<br>D2 = 4 | 1.620 | 60.3 | S-BSM16 |
|  | R2 = ∞ | D3 = 6.5 |  |  |  |
| L2 | R3 = −18.5 | D4 = 3.5 | 1.658 | 50.9 | S-BSM25 |
|  | R4 = −27.2 | D5 = 0.3 |  |  |  |
| L3 | R5 = −145.6 | D6 = 2 | 1.762 | 26.5 | S-TIH14 |
|  | IR1 = 39.5 | D7 = 8.5 | 1.620 | 60.3 | S-BSM16 |
|  | R6 = −45.5 | D8 = 0.3 |  |  |  |
| L4 | R7 = 45.5 | D9 = 8 | 1.620 | 60.3 | S-BSM16 |
|  | R8 = −45.5 | D10 = 3.5 |  |  |  |
| L5 | R9 = 27.2 | D11 = 8.5 | 1.517 | 64.1 | S-BSL7 |
|  | IR2 = −30.4 | D12 = 1.5 | 1.596 | 39.2 | S-TIM8 |
|  | R10 = ∞ | D13 = 2.5 |  |  |  |
| L6 | R11 = −23.7 | D14 = 1.5 | 1.713 | 53.9 | S-LAL8 |
|  | R12 = 23.7 | D15 = 5.236 |  |  |  |

A magnifier 20 constructed according to Table 1 has an effective focal length of about 30 mm, an eye relief from about 15 mm to about 25 mm, a 20 degree semi-field, and is suitable for imaging a display with a diagonal of up to about 21.4 mm while providing a very high quality image across the entire pupil and field of view and through 20 degrees off-axis with minimal astigmatism and other aberrations. It provides a magnification of about 8.3 for an object placed at the focal point when viewed through the magnifier.

Figure 1B:
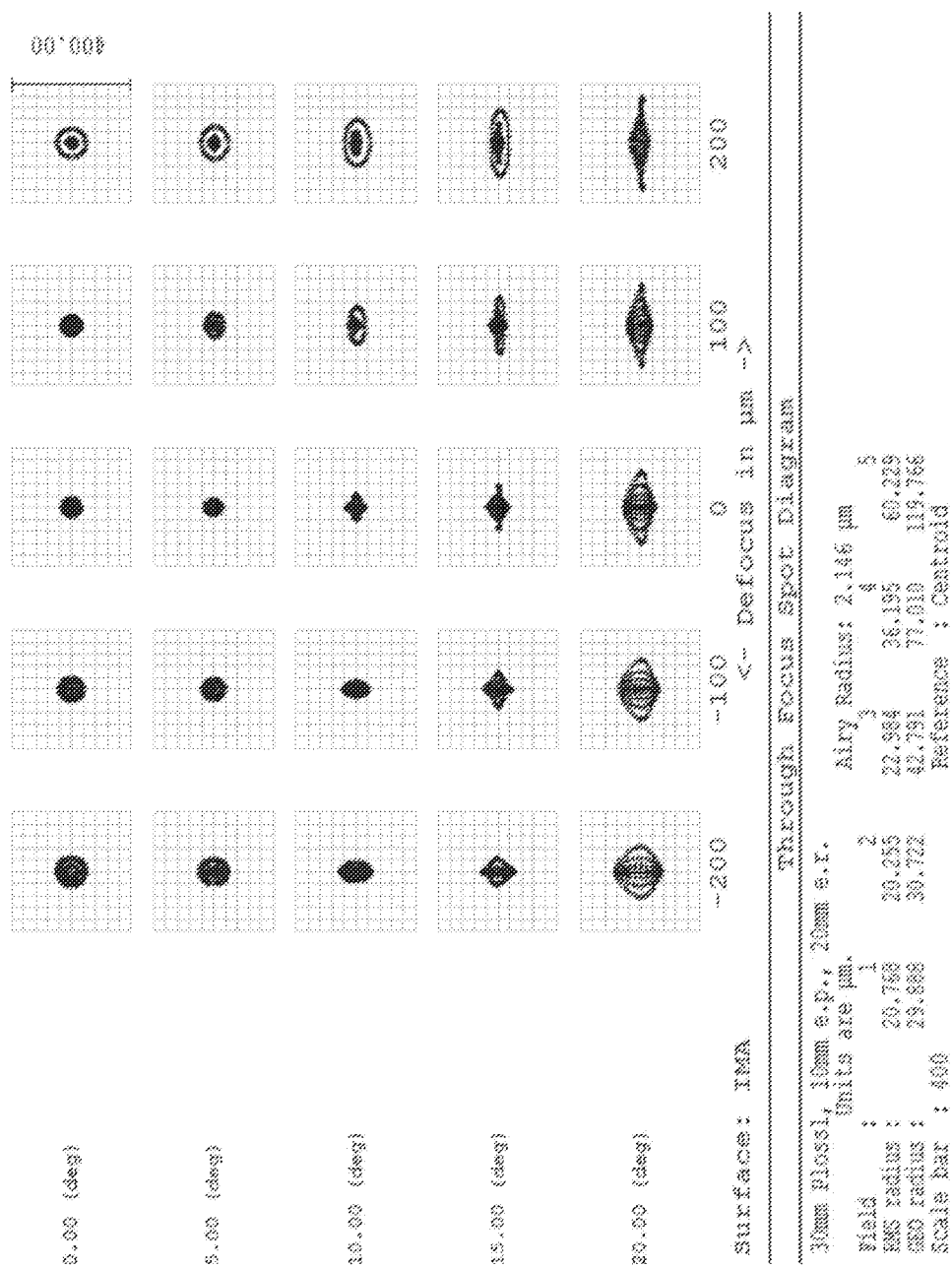
FIG. 1B is a through focus spot diagram for an exemplary version of the Plossl magnifier of FIG. 1A.
Figure 1C:
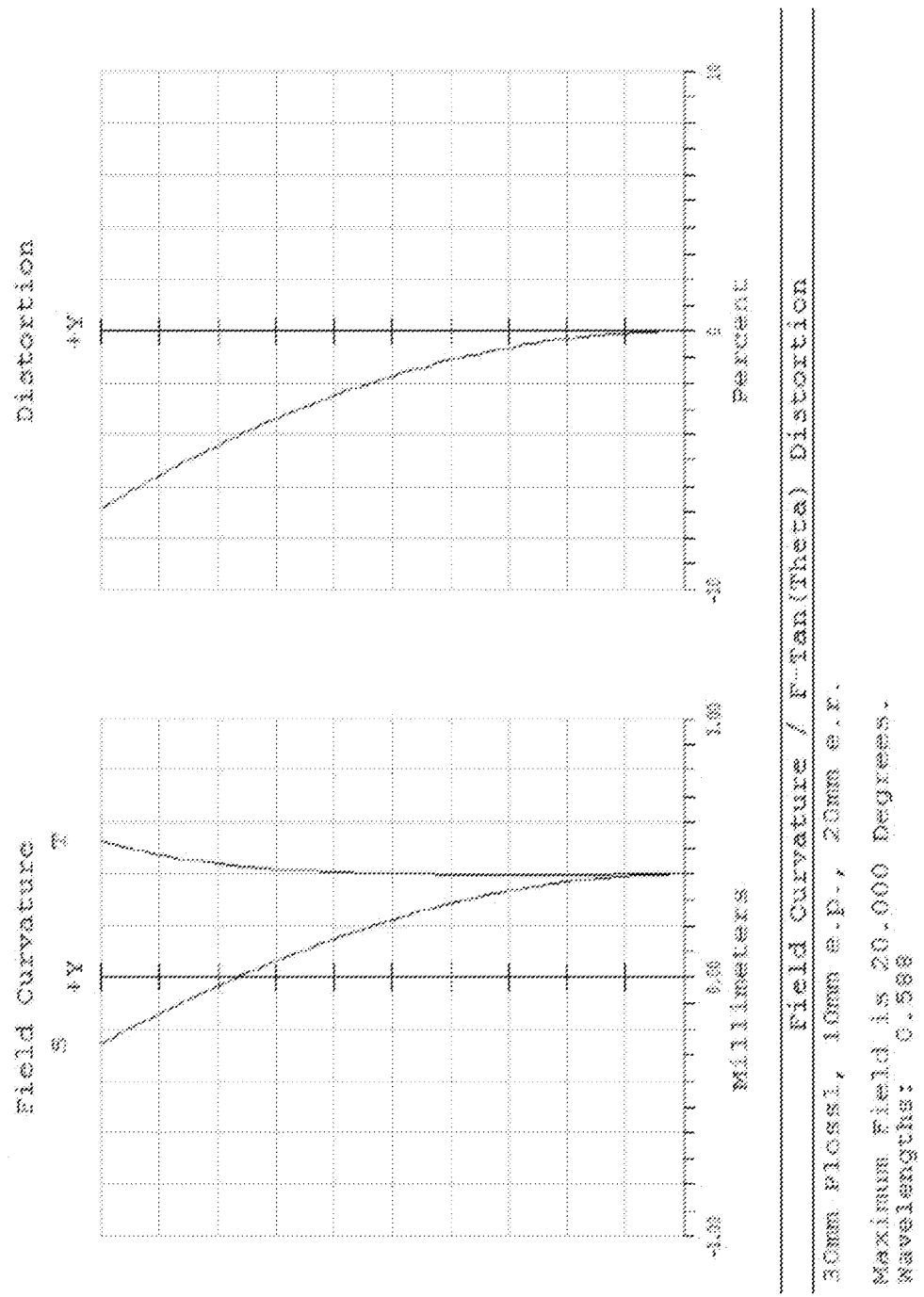
FIGS. 1C-1D are aberration curves for an exemplary version of the Plossl magnifier of FIG. 1A.
Figure 1D:
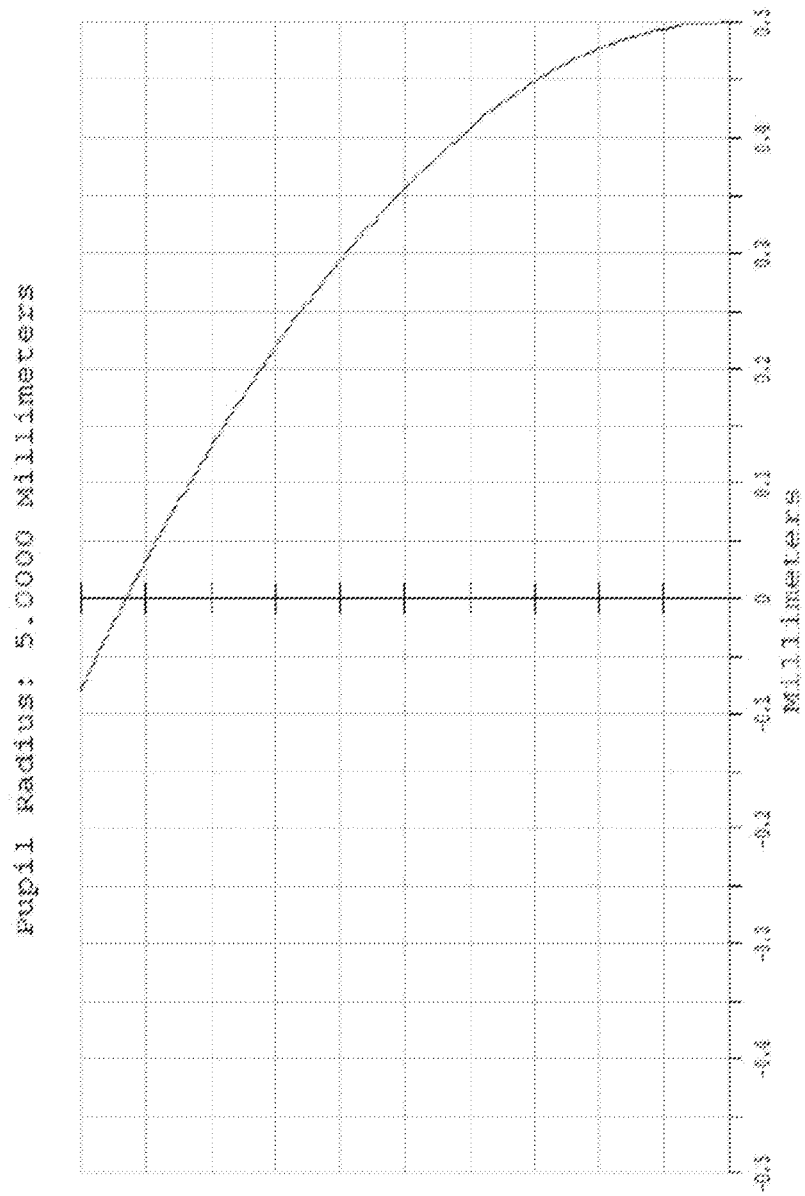
Figure 2B:
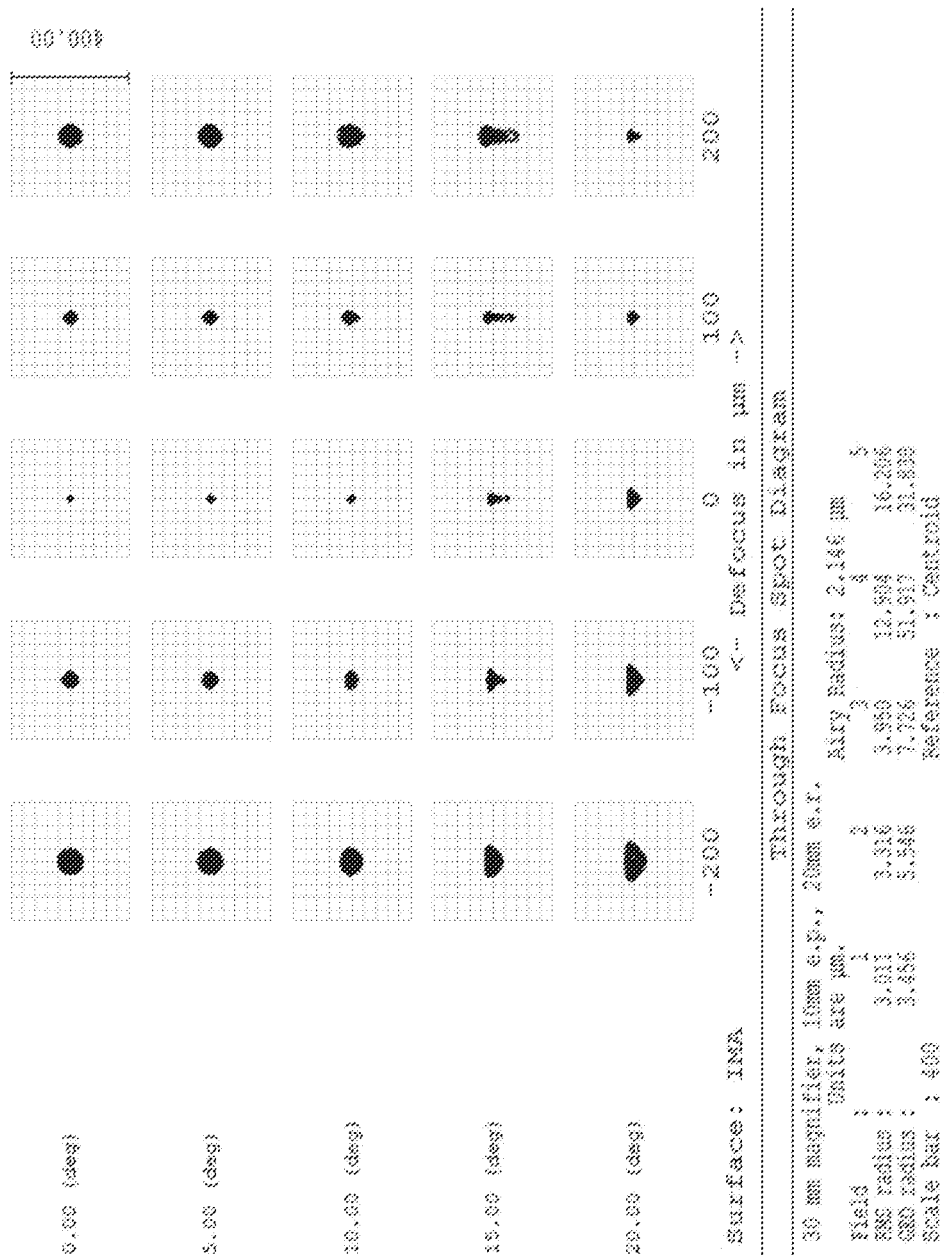
FIG. 2B is a through focus spot diagram for an exemplary version of the magnifier of FIG. 2A.
Figure 2C:
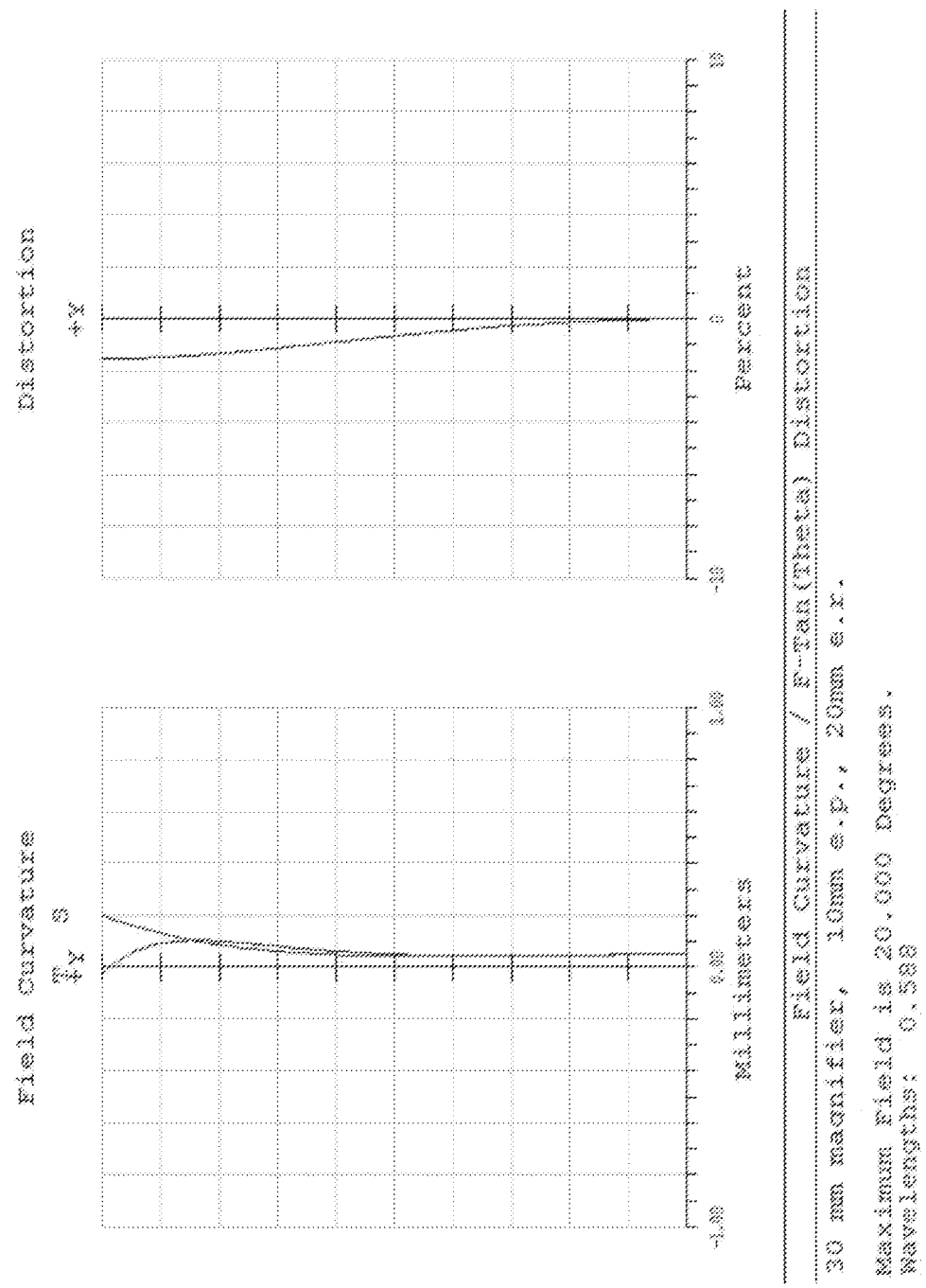
FIGS. 2C-2D are aberration curves for an exemplary version of the magnifier of FIG. 2A.
Figure 2D:
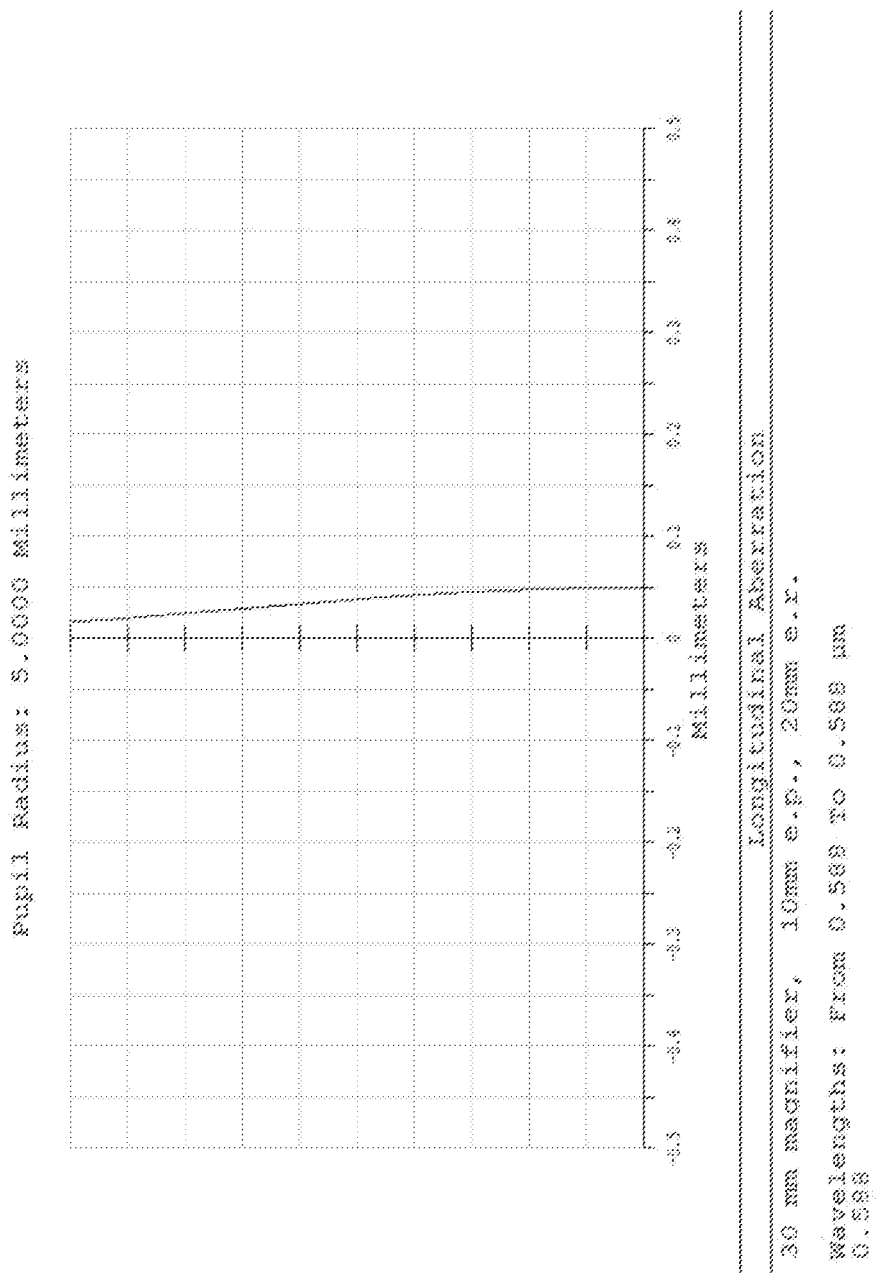

FIG. 2B is a Zemax through focus spot diagram for a magnifier with the exemplary embodiment of Table 1. FIG. 2C shows graphs of field curvature and distortion and FIG. 2D shows a graph of longitudinal aberration. The graphs show aberrations with respect to a wavelength of 0.588 um (green). As can be seen, the magnifier provides a wide-field performance far exceeding that of a conventional Plossl configuration. Minimal aberrations are present through a field of 20 degrees off-axis and with minimal longitudinal aberration across the pupil radius. Considering RMS resolution values, this design provides an on-axis resolution of 0.7', undetectable to a viewer with 20/20 vision. The 10-degree off-axis resolution is 0.9', also undetectable. The 20-degree off-axis resolution is 3.7', which is significantly better than even the on-axis resolution of the example Plossl magnifier of FIG. 1A. This high performance is achieved even without the use of aspheric or diffractive lens surfaces or use of unusually expensive glass types with dispersions Vd>65.

While the through focus spot diagram of FIG. 2B is for green light, substantially similar results are obtained for other colors of light in the visible spectrum, such as 0.486 um light (blue) and 0.646 um light (red). Variations in the specific lens parameters can be made by those of skill in the art while retaining a magnifier with an angular resolution for visible light in this range of less than four arc minutes across a range of on-axis to twenty degrees off-axis and preferably with an angular resolution of less than one arc minute across a range of on-axis to ten degrees off-axis.

The specific lens parameters set forth in Table 1 can be scaled and can otherwise be adjusted to compensate for the use of glass with somewhat different values of $n_d$ and Vd as will be understood by one of ordinary skill in the art to provide a magnifier having performance characteristics similar to those for the exemplary embodiment of Table 1.

In the first embodiment 20, the object 26 to be viewed, such as a micro display, is generally flat and perpendicular to the optical axis. Increasing the scale of the design could permit the use of larger sensors which would be seen at a lower magnification but at the same angular field of view. Decreasing the scale would permit the use of smaller sensors with greater magnification but a decreased eye relief.

Figure 3A:
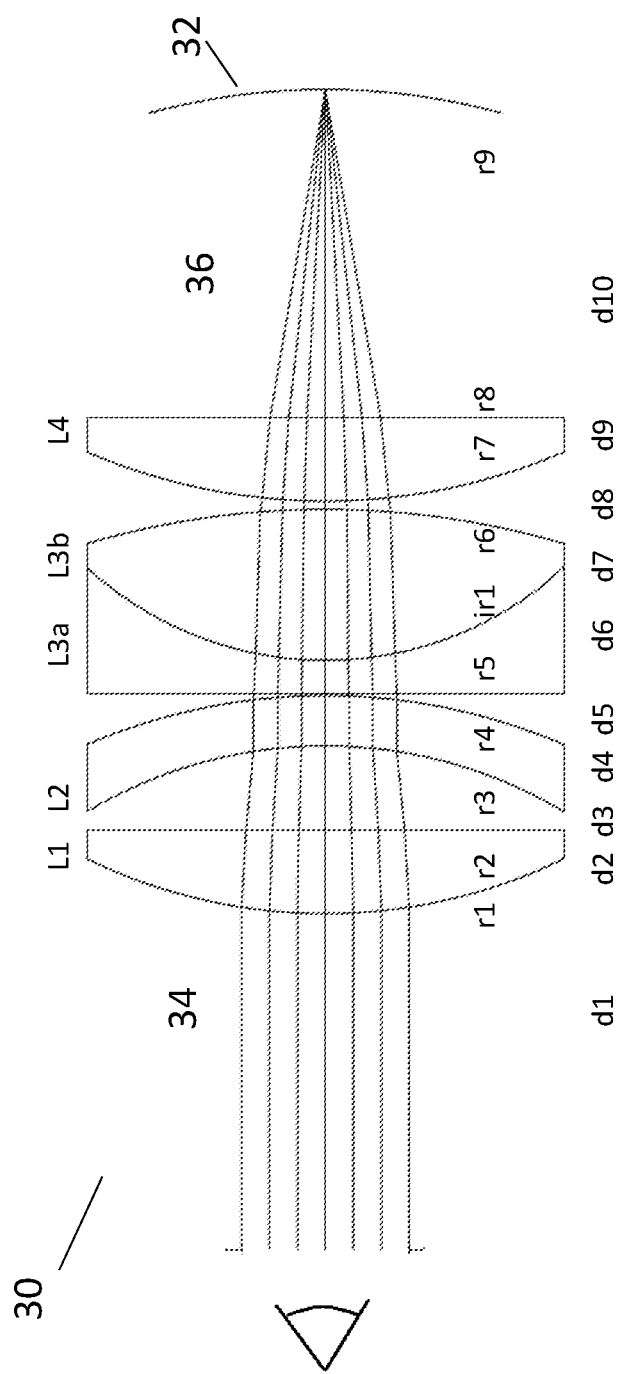
FIG. 3A is a magnifier lens system in accordance with a second embodiment of the invention.

Turning to FIG. 3A there is shown a second embodiment of a magnifying lens assembly 30 suitable for use as a magnifier for a curved surface 32 at the focal plane. A simplified version of a magnifier assembly can be used when the object to be viewed is concave since the magnifier does not need to compensate for the flat object to be viewed across the field of view. Magnifier 30 is comprised of four lenses (L1-L4) arranged along an optical axis from the eye side 34 to the object side 36. Preferably, the third lens L3 is a doublet and the remaining lenses L1, L2, and L4 are singlets. As described further below, all of the lenses have spherical or substantially flat surfaces and can be formed using inexpensive glass that is easy to fabricate.

With reference to FIG. 3A, lens L1 is plano-convex with a convex surface on the eye side having a radius r1 and the object side being substantially flat, i.e., its radius r2 is effectively infinite. Lens L2 is a negative meniscus with an eye side surface that is concave having a radius r3 and an object side surface that is convex (from the object side) and having a radius r4 which is greater than r3. Lens L3 is a doublet comprised of lens components L3a and L3b. Lens L3 has an eye side surface that is substantially flat, i.e., a radius r5=infinity, an internal surface that is concave from the object side with an internal radius ir1, and an object side surface that is convex with a radius r6, where ir1<r6. Lens L4 is plano-convex with a convex eye side surface having a radius r7 and an object side surface that is substantially flat, i.e., a radius r8=infinity.

The lenses in the second embodiment are preferably formed using conventional and widely available glasses with refractive indices varying between about 1.6 and 1.72 and dispersions from about 25 to less than about 65.

In a particular configuration of the embodiment of FIG. 3A, lenses L1, L2, L3b and L4 are formed of the same type of medium index glass. In this configuration, the remaining lens L3a can be formed of a high-index glass.

As can be appreciated, the lenses L1, L2, L3, and L4 in the second embodiment shown in FIG. 3A are generally similar to the lenses L1, L2, L3, and L4 in the first embodiment shown in FIG. 2A.

The specific radii, size, and spacing of the lenses in magnifier 30 can be varied to accommodate the size of the display (or other item) to be viewed. While lens L3 is preferably a doublet, a singlet may be suitable in certain circumstances, such as where the magnifier is intended for use with a monochrome display so that chromatic aberration is not a concern. An exemplary embodiment specifying the lens radii, thickness/spacing, Refractive index $n_d$, Dispersion (Abbe number) Vd glass parameters and a preferred glass type for the lenses in magnifier 30 for use imaging a concave surface having a curvature of about 40 mm is set forth in Table 2 below. The thickness and radii measurements are in mm and are measured along the central optical axis. A radius of infinity refers to a substantially flat surface. Also listed is a preferred type of glass with reference to the OHARA catalog glass designations.

TABLE 2

| Lens | Radii | Thickness/spacing | $n_d$ | Vd | Glass |
|---|---|---|---|---|---|
| | | D1 = 20 | | | |
| L1 | R1 = 36.2 | D2 = 5 | 1.620 | 60.3 | S-BSM16 |
| | R2 = ∞ | D3 = 5 | | | |
| L2 | R3 = −27.7 | D4 = 3 | 1.658 | 50.9 | S-BSM16 |
| | R4 = −36 | D5 = 0.1 | | | |
| L3 | R5 = ∞ | D6 = 2 | 1.717 | 29.5 | S-TIH1 |
| | IR1 = 21 | D7 = 9 | 1.620 | 60.3 | S-BSM16 |
| | R6 = −50.5 | D8 = 0.5 | | | |
| L4 | R7 = 36 | D9 = 5 | 1.620 | 60.3 | S-BSM16 |
| | R8 = ∞ | D10 = 19.5 | | | |
| | R9 = −40 | | | | |

A magnifier 30 constructed according to Table 2 has an effective focal length of about 30 mm, an eye relief of about 20 mm, and is suitable for imaging a concave field with a diameter of up to about 20.3 mm while providing a very high quality image across the entire pupil and field of view through 20 degrees off-axis with minimal astigmatism and other aberrations. It provides a magnification of about 8.3 for an object placed at the focal point when viewed through the magnifier.

Figure 3B:
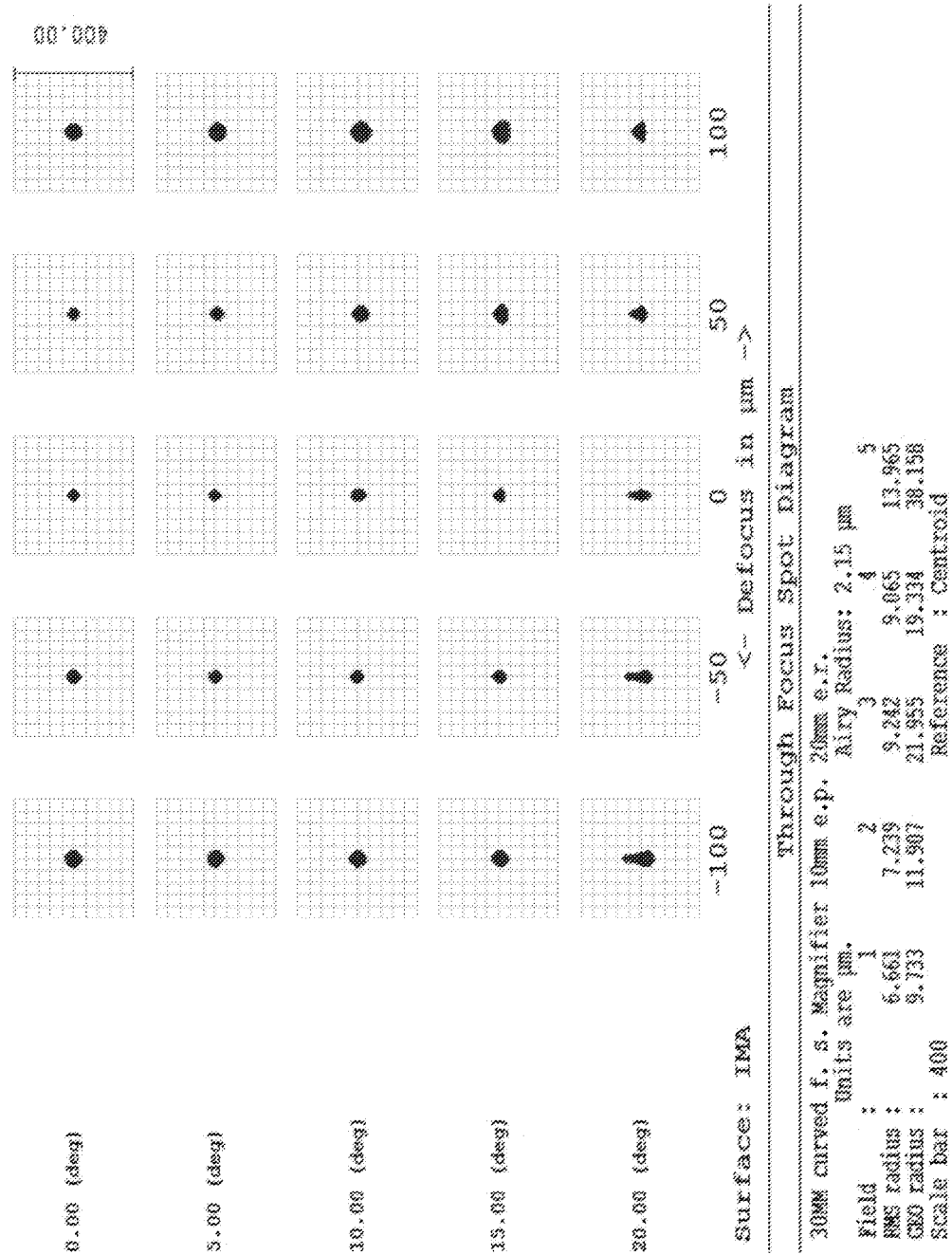
FIG. 3B is a through focus spot diagram for an exemplary version of the magnifier of FIG. 3A.
Figure 3C:
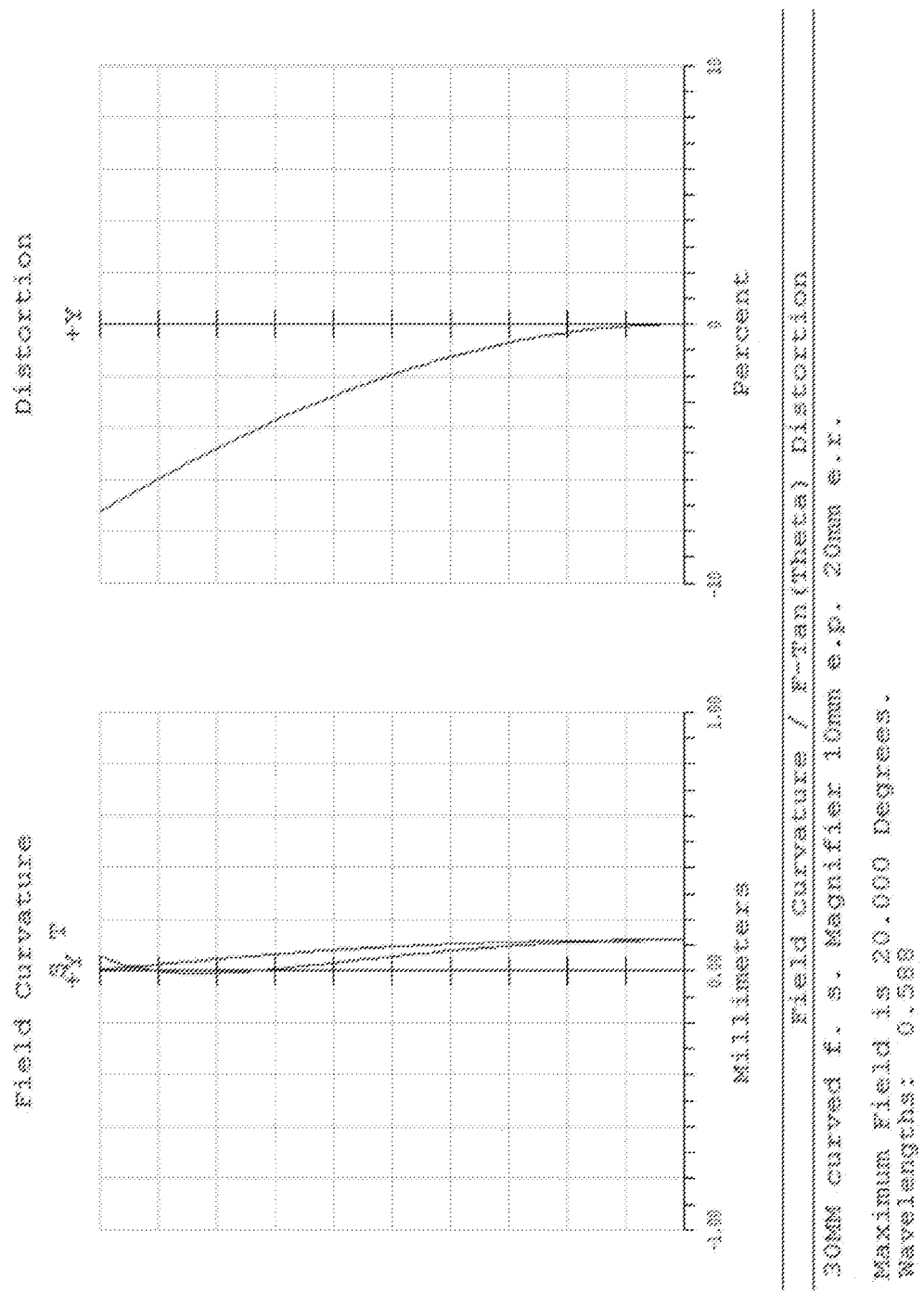
FIGS. 3C-3D are aberration curves for an exemplary version of the magnifier of FIG. 3A.
Figure 3D:
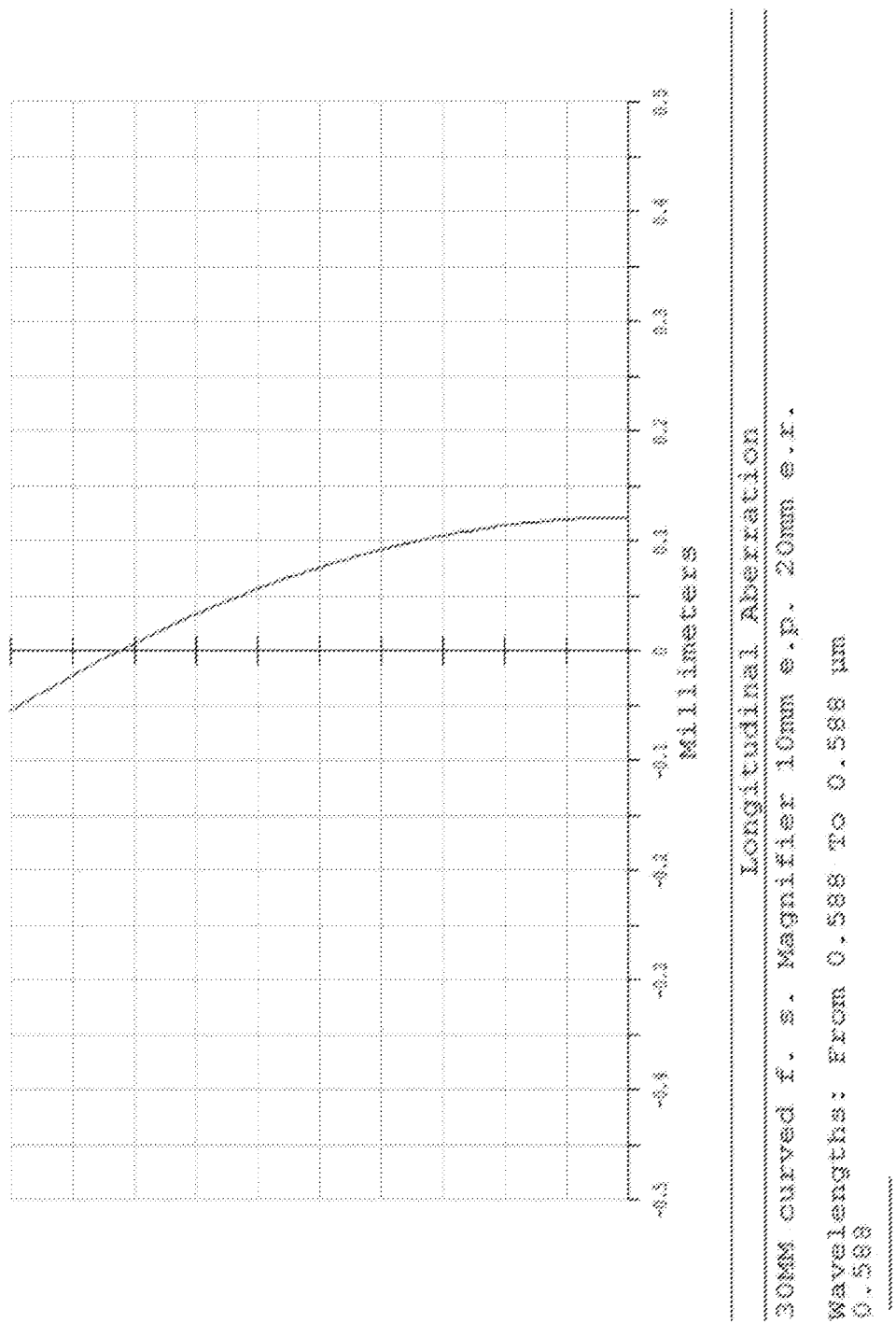

FIG. 3B is a Zemax through focus spot diagram for the exemplary embodiment of Table 2. FIG. 3C shows graphs of field curvature and distortion and FIG. 3D shows a graph of longitudinal aberration. The graphs show aberrations with respect to a wavelengths of 0.588 (green). As can be seen, the magnifier provides a wide-field performance far exceeding that of a conventional Plossl configuration with only one additional lens element relative to a conventional Plossl design. Minimal aberrations are present through a field of 20 degrees off-axis and with minimal longitudinal aberration across the pupil radius. Considering RMS resolution values, this design provides an on-axis resolution of 1.5', a 10-degree off-axis resolution 2.1', and a 20-degree off-axis resolution of 3.2'. This is significantly better than even the on-axis resolution of the example Plossl magnifier of FIG. 1A.

While the through focus spot diagram of FIG. 3B is for green light, substantially similar results are obtained for other colors of light in the visible spectrum, such as 0.486 um light (blue) and 0.646 um light (red). Variations in the specific lens parameters can be made by those of skill in the art while retaining a magnifier with an angular resolution for visible light in this range of of less than four arc minutes across a range of on-axis to twenty degrees off-axis and preferably with an angular resolution of less than 2.5 arc minute across a range of on-axis to ten degrees off-axis. This high performance is achieved even without the use of aspheric or diffractive lens surfaces or use of unusually expensive glass types with dispersions Vd>65.

The specific lens parameters set forth in Table 2 can be scaled and can otherwise be adjusted to compensate for the use of glass with somewhat different values of $n_d$ and Vd as will be understood by one of ordinary skill in the art to provide a magnifier having performance characteristics similar to those for the exemplary embodiment of Table 2. In addition, the design can be scaled up or down according to the size of the area being imaged.

In the embodiments shown in FIGS. 2A and 3A, the lenses would typically be housed in an eyepiece barrel that is positioned over the area to be viewed. However, other assemblies known to those of skill in the art can also be used. The magnifier can be permanently affixed within the larger system or removable by the user. Conventional focus and alignment adjustments can be provided. In one embodiment, a magnifier as shown herein, such as in FIG. 2A or 3A, is incorporated into the viewfinder of a digital still or video camera. The large eye relief allows for comfortable viewing and also very low image aberration over a wide field of view. As a result, a sharply magnified display can be easily viewed even when the viewer's eye is relatively distant from and not held in a fixed position relative to the magnifier (such as via a rubber eyecup).

Various aspects of the invention have been disclosed and described herein. However, various modifications, additions and alterations may be made by one skilled in the art without departing from the spirit and scope of the invention as defined in the appended claims.

What is claimed is:

1. A magnifying eyepiece having an eye side and an object side and a comprising, from a front eye side to a rear object side:

a first lens being plano-convex having a convex first surface with a radius r1 on the eye side and a second surface on the object side having a substantially flat radius r2;

a second lens being a negative meniscus with a concave third surface on the eye side having a radius r3 and a convex fourth surface on the object side having a radius r4, wherein r4 is greater than r3;

a third lens having a concave fifth surface on the eye side with a radius r5, and a convex sixth surface on the object side with a radius r6, wherein r5 is substantially greater than r6;

A fourth lens being bi-convex and having an seventh surface on the eye side with radius r7 and an eighth surface on the object side with a radius r8, wherein r7 and r8 are substantially equal to each other;

a fifth lens having a convex ninth surface on the eye side with a radius r9 and a tenth surface on the object side having a substantially flat radius r10; and a sixth lens being bi-concave and having eleventh surface on the eye side with a radius r11 and a twelfth surface on the object side surface with a radius r12, wherein r11 is substantially equal to r12.

2. The magnifying eyepiece of claim 1, wherein r7 and r8 are substantially equal to r6.

3. The magnifying eyepiece of claim 1, wherein:
the third lens is a doublet having an object side lens component and an eye side lens component meeting at a first internal surface concave from the object side with a radius ir1 that is less than r6; and
the fifth lens is a doublet having an object side lens component and an eye side lens component meeting at a second internal surface convex from the object side with a radius ir2 that is greater than r9.

4. The magnifying eyepiece of claim 3, wherein
the first lens, the second lens, the object side lens component of the third lens, the fourth lens, and the object side lens component of the fifth lens comprise a medium index glass;
the eye side lens component of the third lens and the sixth lens comprise a high index glass; and
the eye side lens component of the fifth lens comprises a low index glass.

5. The magnifying eyepiece of claim 1, wherein the first through sixth lenses cooperate to provide a magnifier having an angular resolution of less than four arc minutes across a range of on-axis to twenty degrees off-axis.

6. The magnifying eyepiece of claim 5, wherein the first through sixth lenses cooperate to provide a magnifier having an angular resolution of less than one arc minute across a range of on-axis to ten degrees off-axis.

7. A magnifying eyepiece for viewing a concave image plane, the eyepiece having an eye side and an object side and a comprising, from a front eye side to a rear object side:

a first lens being plano-convex having a convex first surface with a radius r1 on the eye side and a second surface on the object side having a substantially flat radius r2;
a second lens being a negative meniscus with a concave third surface on the eye side having a radius r3 and a convex fourth surface on the object side having a radius r4, wherein r4 is greater than r3;
a third lens having a fifth surface on the eye side with a substantially flat radius r5 and a convex sixth surface on the object side with a radius r6; and
a fourth lens being plano-convex and having an eye side seventh surface with radius r7 and an object side eighth surface with a substantially flat radius r8.

8. The magnifying eyepiece of claim 7, wherein r4 and r7 are substantially equal to each other.

9. The magnifying eyepiece of claim 7, wherein the third lens is a doublet comprised of an eye side lens component and an object side lens component meeting at a first internal surface concave from the object side with a radius ir1, wherein r6 is greater than ir1.

10. The magnifier of claim 8, wherein
the first lens, the second lens, the object side lens component of the third lens, and the fourth lens comprises a medium index glass; and
the eye side lens component of the third lens comprises a high-index glass.

11. The magnifying eyepiece of claim 7, wherein the first through fourth lenses cooperate to provide a magnifier having an angular resolution of less than four arc minutes across a range of on-axis to twenty degrees off-axis.

12. The magnifying eyepiece of claim 11, wherein the first through fourth lenses cooperate to provide a magnifier having an angular resolution of less than 2.5 arc minutes across a range of on-axis to ten degrees off-axis.

* * * * *